Dec. 20, 1927. Re. 16,827

H. F. VIEAU ET AL.

RINSING AND DRYING APPARATUS

Original Filed Sept. 5, 1925 3 Sheets-Sheet 1

INVENTORS.
Harold F. Vieau
Roy C. Higby
Edward J. O'Neill,

BY Geo. P. Kimmel. ATTORNEY.

Dec. 20, 1927. Re. 16,827

H. F. VIEAU ET AL.

RINSING AND DRYING APPARATUS

Original Filed Sept. 5, 1925 3 Sheets-Sheet 2

INVENTORS
H. F. Vieau
R. C. Higby
E. J. O'Neill,
BY
Geo. P. Kimmel.
ATTORNEY.

Dec. 20, 1927.

Re. 16,827

H. F. VIEAU ET AL.

RINSING AND DRYING APPARATUS

Original Filed Sept. 5, 1925 3 Sheets-Sheet 3

INVENTORS
Harold F. Vieau
Roy C. Higby
Edward J. O'Neill,
BY Geo. P. Kimmel ATTORNEY.

Reissued Dec. 20, 1927.

Re. 16,827

UNITED STATES PATENT OFFICE.

HAROLD F. VIEAU, OF LIVERPOOL, ROY C. HIGBY, OF BIG MOOSE, AND EDWARD J. O'NEILL, OF SYRACUSE, NEW YORK.

RINSING AND DRYING APPARATUS.

Original No. 1,590,002, dated June 22, 1926, Serial No. 54,770, filed September 5, 1925. Application for reissue filed February 18, 1927. Serial No. 169,389.

This invention relates to a centrifugal extractor, and more especially to the class of apparatuses for rinsing and drying clothes.

The primary object of the invention is the provision of an extractor or apparatus of the character referred to for expeditiously and satisfactorily rinsing and drying clothes.

Another object of the invention is the provision of an extractor or apparatus for the purpose referred to, wherein a combined rinsing and drying chamber is provided, whereby the rinsing water can be conducted off from the combined rinsing and drying chamber to any selective point desired for the discharge of the water at the selected location circumferentially of the chamber.

A still further object of the invention is the provision of an apparatus of this character, which is comparatively simple in construction, thoroughly reliable and efficient in its purpose, strong, durable, compact, readily assembled and comparatively inexpensive to manufacture and install.

With the foregoing and other objects in view, the invention consists in the features of construction, combination and arrangement of parts, as will be hereinafter more specifically described in detail and illustrated in the accompanying drawings, wherein is shown the preferred embodiment of the invention, but it is to be understood that changes, variations and modifications can be made as come properly within the scope of the appended claims without departing from the spirit of the invention or sacrificing any of its advantages.

In the accompanying drawings.

Similar reference characters indicate corresponding parts throughout the several views in the drawings.

Figure 1:
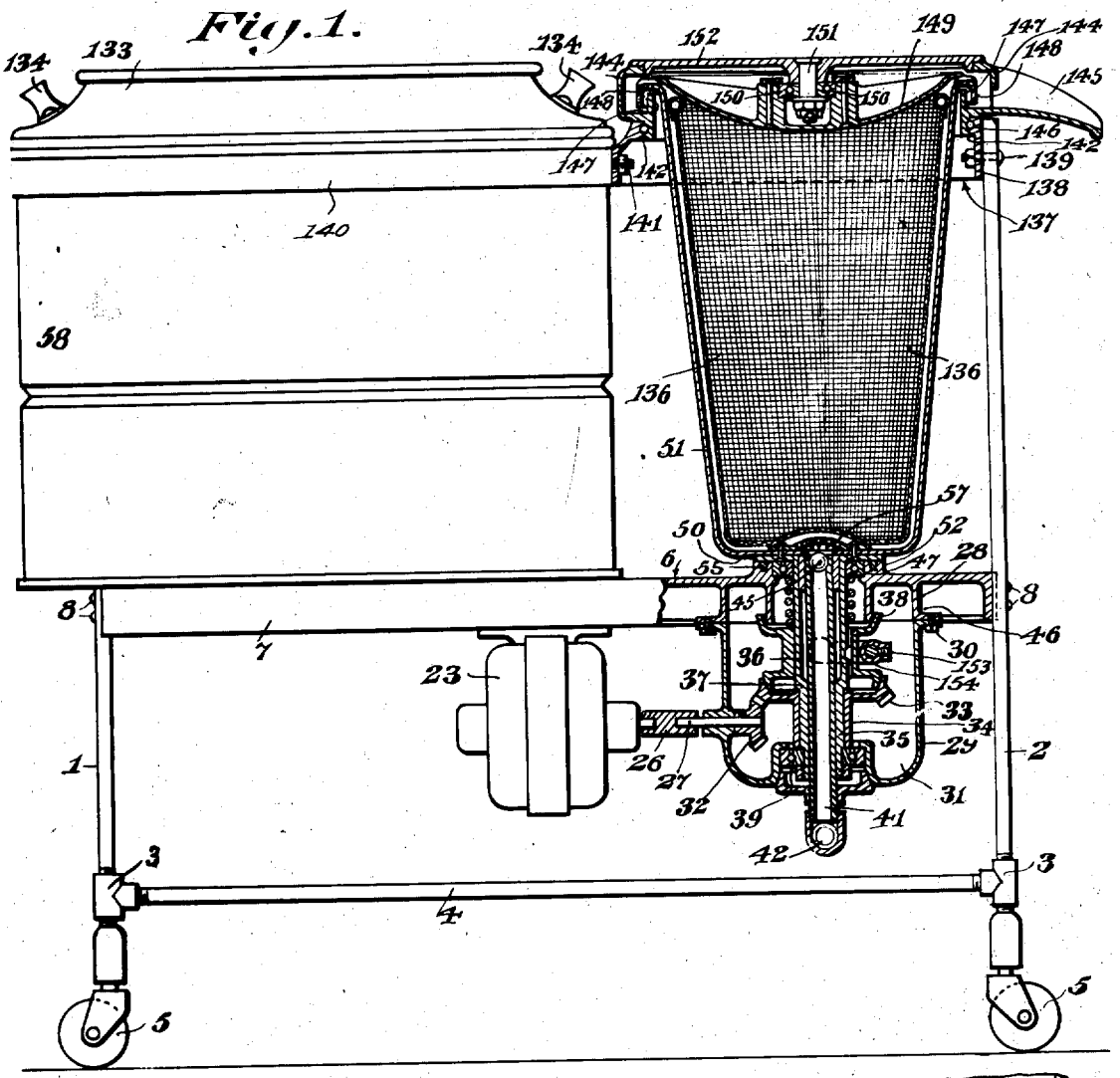
Figure 1 is a front elevation, partly in section of a rinsing and drying apparatus constructed in accordance with the invention.
Figure 2:
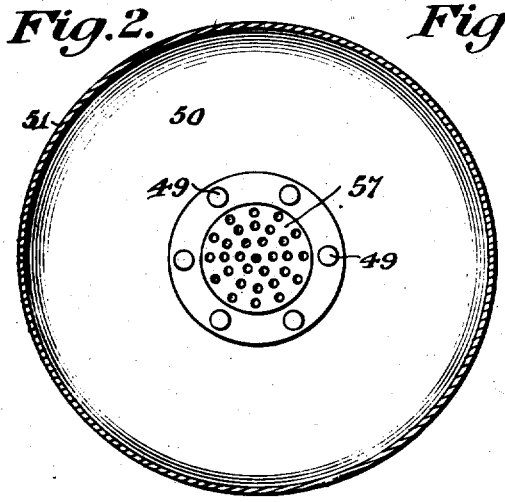
Figure 2 is a sectional plan view illustrating the receptacle in section, forming the combined rinsing and drying chamber.
Figure 3:
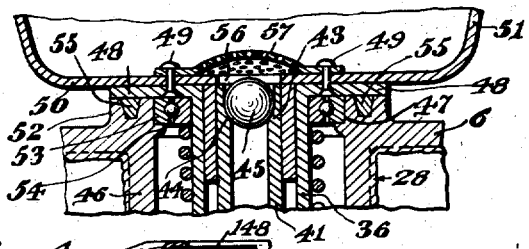
Figure 3 is a fragmentary view, in section, illustrating the closure valve for the combined rinsing and drying chamber.

Referring to the drawings in detail, the apparatus constructed in accordance with the invention, that is the preferred form thereof, comprises a mobile support, which in this instance includes a pair of vertically disposed spaced, opposite supporting legs 1, only one of which being shown, a pair of vertically disposed spaced supporting standards 2 of greater height than the legs 1. The legs and standards carry substantially T-couplings 3 of conventional type and extending from the coupling 3, which is secured to the leg 1 and the coupling 3 which is secured to the standard 2, is a combined connecting and brace rod 4. The legs, as well as the standards, have connected to the lower ends thereof and below the rods 4, castors or rollers 5 which may be of any conventional type. Arranged between the legs and the standards 2 as well as being secured to the upper terminal portions of the legs and to the standards intermediate the ends of these latter is a platform 6, provided with a continuous depending flange 7, which is secured by the holdfast devices 8 to the legs and standards.

Supported from the platform 6 is an electric motor 23, although any other form of motive power may be employed, having its shaft coupled as at 26, with a shaft 27 to be hereinafter referred to. Depending from the platform 6 is a sectional casing, which comprises an upper section 28 and a lower section 29. The sections 28 and 29 are secured together as at 30. The sections 28 and 29 of said casing provide a chamber 31 into which extends the shaft 27 and that end of the shaft 27 arranged within the chamber 31 is provided with a beveled gear 32, which meshes with a beveled gear 33 carried on the upper end of a vertically disposed sleeve 34. Extending into the sleeve 34 is the lower portion 35 of a hollow operating shaft 36 for the receptacle which provides the combined rinsing and drying chamber, which receptacle will be hereinafter more fully described. The lower portion 35 of the shaft 36 is inset with respect to the upper portion thereof which provides a shoulder 37 bearing against the upper end of the sleeve 34. Mounted on the upper portion of the shaft 36 is a spring controlled shiftable clutching mechanism 38 for coupling the sleeve 34 to the shaft 36, whereby on the operation of the shaft 27 the shaft 36 will be carried therewith. Bearing means 39 are provided for the lower ends of the sleeves 34 and the lower end 35 of the shaft 36.

Extending up through the chamber 31 and of a length to project thereabove and to depend therefrom, is a water conducting pipe 41, having its lower end coupled with a supply pipe 42. Interposed between the upper portion of the pipe 41 and the upper portion of the shaft 36 is a bearing pipe 43. The inner face of the pipe, at the upper end thereof, is beveled to provide a valve seat 44 and cooperating with said seat is a ball valve 45. The function of the valve 45 is to close the upper end of the pipe 41 when the supply of water thereto is cut off. The valve 45 acts as a check to retard back flow of water to the supply pipe.

Depending from the platform 6 is a stationary annular collar 46 which acts in connection with the clutch mechanism 38 to provide a braking action to overcome the sudden stoppage of and to gradually bring the receptacle 51 to a stop. This also applies when clutching gear 33. The platform 6 is formed with an opening 47 for the passage of the shaft 36 and pipe 41. The shaft 36 at its upper end is formed with an annular flange 48 for securing it by the rivets 49 to the bottom 50 of the receptacle 51 which forms the combined rinsing and drying chamber.

The platform 6 has its upper face provided with an annular boss 52 and arranged between the latter and the shaft 36 is a bearing element 53, preferably in the form of bearing balls, supported on a shoulder 54 provided on the platform 6 at the wall of the opening 47. The boss 52 carries a packing strip 55 which is engaged by the flange 48. The bottom 50 of the receptacle 51 is formed with an opening 56 which communicates with the pipe 41, when the valve 45 is unseated. Arranged over the opening 56 and secured to the bottom 51 by the rivets 49 is a dome-shaped perforated plate 57 which acts as a filtering medium to prevent foreign substances being fed to the receptacle 51 through the pipe 41 and also to prevent foreign substances from passing from the receptacle 51 into the pipe 41. This prevents any possibility of the clogging of the valve 45. The chamber 31, the collar 46, opening 47 and boss 52 are arranged forwardly of the platform 6.

Mounted on the platform 6, as well as projecting laterally therefrom for a distance, is a tub 58 which provides a storage or washing chamber. The tub 58 is provided with a removable lid or cover 133 formed with handles 134, which cover can be utilized as a support when on the tub for the placing of a container for clothes, whereby the latter can be readily assorted or held within such container.

The receptacle 51 which forms a combined rinsing and drying chamber or a centrifugal extractor, when operated is preferably of tapered contour and gradually increases in diameter from its lower end to its upper end. Arranged within the receptacle 51 is a tapered foraminous basket 136 of slightly less height than the height of the receptacle and is readily and easily removed from said receptacle should the occasion require.

Arranged between the tub 58 and the standard 2 is a holder 137, preferably in the form of an annulus having a depending flange 138 at the front and rear thereof, and with the forward flange of greater height than the rear flange. The forward flange is secured to the standard 2 by the holdfast devices 139 and the rear flange to the retaining member 140 which encircles the tub 58 externally thereof. The retaining member 140 and rear flange of the holder are fastened together by holdfast devices 141. The holder 137 at its rear extends forwardly at an upward inclination as at 143 and the holder is cut away to form an opening 142 which is located at the top of the upstanding portion 143 and the top of the said upstanding portion opposes the top of the forward flange 138. Positioned within the opening 142 is a freely adjustable or rotatable drain trough which has depending therefrom an annulus rotatably engaged in the opening 142. The trough 144 which is disposed concentrically of the annulus engaged in the opening 142 exteriorly thereof has provided at one point thereof a slightly inclined discharge spout or drain extension 145. Bearing elements 146 are interposed between the annulus of the trough 144 and the upstanding portion 143 of the holder. The trough 144 is provided with an inwardly arranged vertically extending annular flange 147, which constitutes the inner wall of said trough and this flange is overlapped by an outturned depending portion 148 formed at the upper end of the receptacle 51. This outturned depending portion 148 at the point of the bight thereof overlying the inner wall of the trough is suitably fluted or corrugated to afford spaces for the passage of fluid from the receptacle 51 over the bight and the flange 148 into the trough.

Extending into the upper end of the receptacle 51 is a concaved closure 149 therefor which is provided centrally with a bearing means 150 for a pivot 151, carried by a cover plate 152, which is removably mounted on and encloses the closure 149. In other words the cover plate 152 serves as a lid or closure for the trough 144. The cover 149 revolves with the receptacle 51 and around the pivot 151. When the closure 152 and cover 149 are removed, the trough 144 can be swung around so that the discharge spout 145 may be located to overhang the upper open end of the tub 58, that is after the cover 133 has been removed therefrom. Furthermore the trough 144 can be manually adjusted to locate the spout 145 at any selected point circumferentially of the receptacle 51, so that the discharge or overflow from the receptacle 51 can be deposited at any required point to suit the fancy of the user of the apparatus. To make it perfectly clear and plain the trough 144 can be shifted to position the spout 145 at any required point selected for the discharge circumferentially of the receptacle to permit the overflow from said receptacle to be deposited at the location selected.

Figure 6:
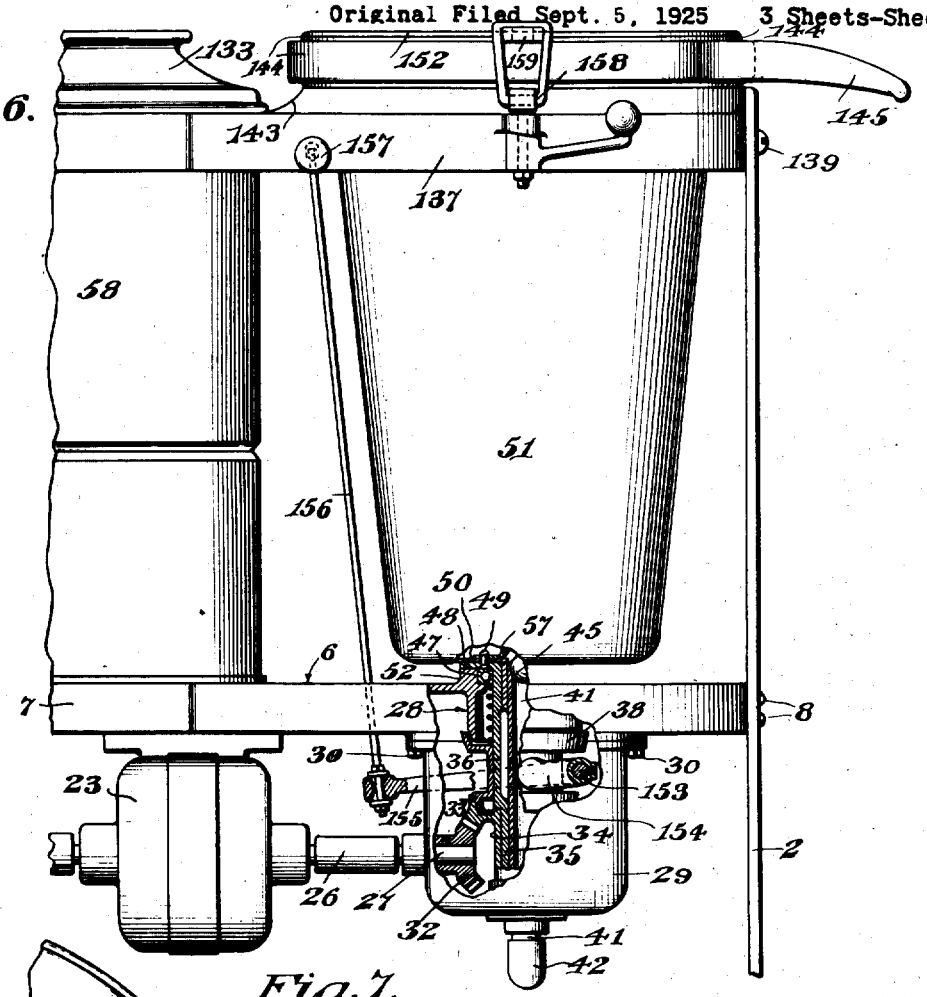
Figure 6 is a fragmentary view in side elevation and partly in section of a rinsing and drying apparatus in accordance with this invention.
Figure 7:
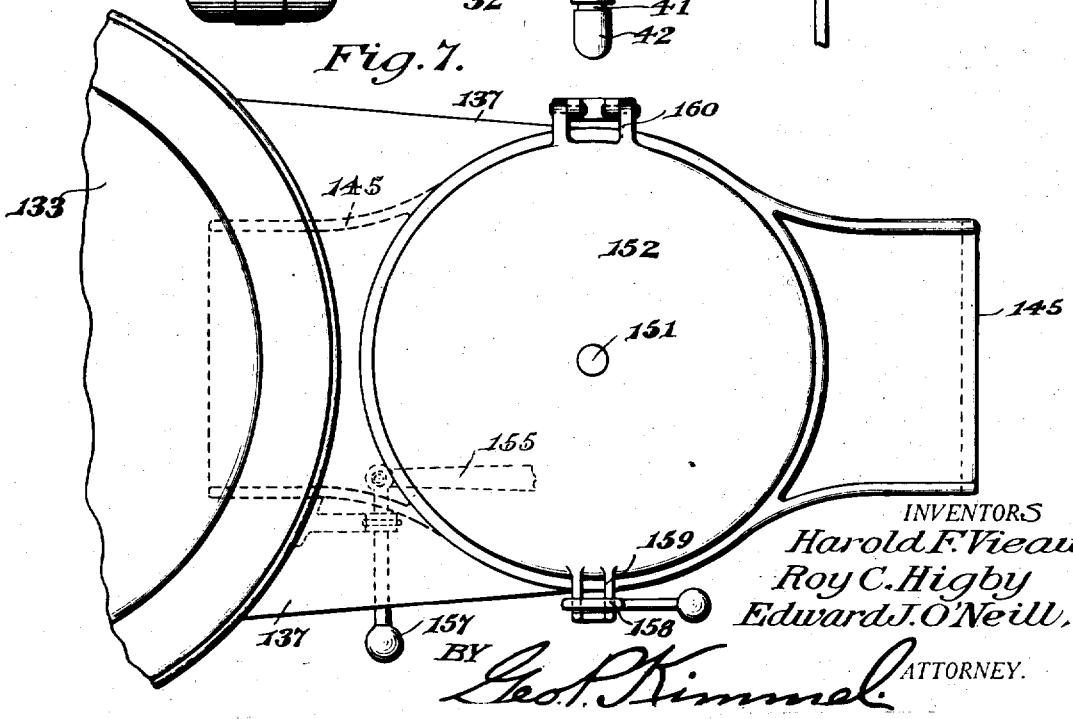
Figure 7 is a fragmentary view in plan of the apparatus.

Any suitable means can be employed for shifting the clutching mechanism 38 to discontinue the revolving of the receptacle 51 when the occasion requires, and in Figures 6 and 7 there is illustrated a conventional type of a clutch mechanism shifting means comprising a rock shaft 153 extending through the chamber 31 and provided with a bifurcated crank arm 154 which straddles the clutching mechanism 38. When the shaft 153 is rocked in one direction, the crank arm 154 will shift the clutching mechanism upwardly, against the action of its controlling spring, to disconnect the shaft 36 from the motor 23. The shaft 153 carries a crank arm 155 arranged exteriorly of the chamber 31, and which is attached to an upstanding pull rod 156 having its upper end connected to a pivotally mounted counterbalanced handle member 157.

Conventional means as at 158 is illustrated in Figures 6 and 7 for releasably locking the cover plate 152 in closure position with respect to the trough 144. The locking means 158 is carried by the holder 137 and detachably engages with lugs 159 extended from the plate 152. A conventional hinge connection 160 is provided between the plate 152 and the holder 137.

The operating mechanism of the shaft 36 will operate in oil. The receptacle 51 which forms the extractor chamber 135 is employed for extracting the water from the clothes within the basket 136 by a centrifugal action.

Further, the drying of the clothes within the basket 136 can also be had by centrifugal action as will be clearly obvious.

The element 57 acts as a filter as before stated, so that clean water will enter the basket 136 and foreign bodies will be prevented from choking the valve 45. The valvular arrangement permits of clean water to be supplied to the chamber 135 irrespective of whether the receptacle 51 is revolving or not. The adjustable trough 144 permits of discharging the overflow water from the chamber 135 through its top as this overflow will pass through the fluted portion between the receptacle and the closure 149 into the trough 144 and be discharged from the spout 145 at the point of location thereof under the adjustment of the trough as hereinbefore explained. This trough 144 also takes care of discharging soapy water from the chamber 135 into the chamber formed by the tub 58, when the spout 145 is located over the tub to deliver the discharge from the trough thereinto. The cover plate 152 will bind the trough 144 from movement, when said cover plate is fastened in position by the locking means 158. The basket 136 is removably mounted within the receptacle 51 so that when occasion requires the basket with the rinsed clothes can be removed.

The closure 152 when in closing position may be utilized as a support for a clothes basket or other clothes container or the like if required.

Figure 4:
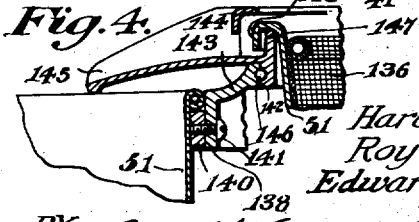
Figure 4 is a fragmentary view, in section, illustrating the drainage element for the combined rinsing and drying chamber.
Figure 5:
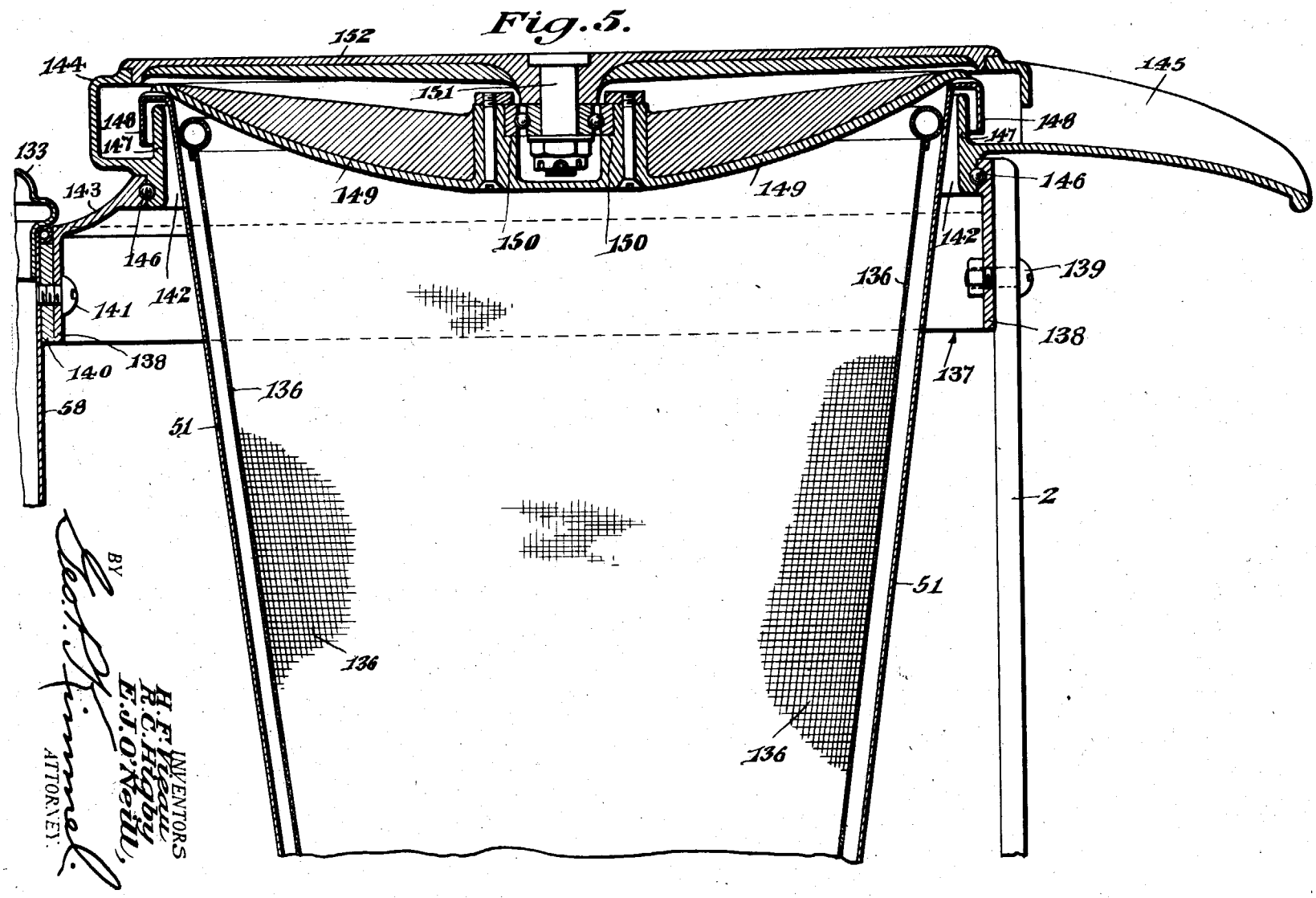
Figure 5 is an enlarged fragmentary view of the upper part of the rinsing and drying apparatus, showing in detail the discharge means for water selectively adjustable.

By reference to Figure 1 of the drawings it will be noted that the trough 144 has been positioned so that its spout 145 is remote from the location of the tub 58 and the overflow from the receptacle 51 into the trough 144 can be discharged through the spout 145 at the point of location of said spout. Now with reference to Figure 4 of the drawings it will be noted that the trough 144 has been adjusted so as to bring its spout 145 directly over the tub 58, whereby the overflow from the receptacle 51 or the soapy water can be directed into the tub from said trough.

It is thought the many advantages of an apparatus for rinsing and drying clothes in accordance with this invention can be readily understood, and although the preferred embodiment of the invention is as illustrated and described, yet it is to be understood that changes in the details of construction can be had which will come within the scope of the invention.

What we claim is:—

1. An apparatus for the purpose set forth comprising an inverted cone-shaped receptacle, a foraminous basket arranged therein and corresponding in contour thereto, a vertically disposed revoluble hollow shaft connected with the bottom of and opening into said receptacle for operating and supplying water to the latter, a perforated guard of convex cross section secured to the upper face of the bottom of said receptacle and spaced from the upper end of said shaft, and means for operating said shaft.

2. An apparatus for the purpose set forth comprising an inverted cone-shaped receptacle, a foraminous basket arranged therein and corresponding in contour thereto, a vertically disposed revoluble hollow shaft connected with the bottom of and opening into said receptacle for operating and supplying water to the latter, means for operating said shaft, and a guard connected to and spaced from the upper face of the bottom of said receptacle over the upper end of said shaft.

3. An apparatus for the purpose set forth comprising an inverted cone-shaped receptacle, a foraminous basket arranged therein and corresponding in contour thereto, a vertically disposed revoluble hollow shaft connected to the bottom of and opening into said receptacle, a water conducting pipe extended into said shaft and having its inner face at its upper end bevelled to provide a valve seat, a check valve associated with said seat, and means for operating said shaft.

4. An apparatus for the purpose set forth comprising an inverted cone-shaped receptacle, a foraminous basket arranged therein and corresponding in contour thereto, a vertically disposed revoluble hollow shaft connected to the bottom of and opening into said receptacle, a water conducting pipe extended into said shaft and having its inner face at its upper end bevelled to provide a valve seat, a check valve associated with said seat, means for operating said shaft, and braking means for said shaft.

5. An apparatus for the purpose set forth comprising an open top receptacle, an open top foraminous basket mounted therein, a shaft for rotating said receptacle, a driven mechanism for operating the shaft and including simultaneously bodily shiftable shaft clutching and braking applying means, a closure for the receptacle, means for supplying and carrying off water to and from the receptacle, and means for interengagement with said shaft clutching means for driving said mechanism to operate the shaft.

6. An apparatus for the purpose set forth comprising an open top receptacle, an open top foraminous basket mounted therein, a shaft for rotating said receptacle, a driven mechanism for operating the shaft and including simultaneously bodily shiftable shaft clutching and braking applying means, a closure for the receptacle, means for supplying and carrying off water to and from the receptacle, and means for interengagement with said shaft clutching means for driving said mechanism to operate the shaft, said basket spaced from said receptacle.

7. An apparatus for the purpose set forth comprising an open top receptacle, an open top foraminous basket mounted therein, a shaft for rotating said receptacle, a driven mechanism for operating the shaft and including simultaneously bodily shiftable shaft clutching and braking applying means, a closure for the receptacle, means for supplying and carrying off water to and from the receptacle, and means for interengagement with said shaft clutching means for driving said mechanism to operate the shaft, said basket spaced from said receptacle, and said shaft depending from and said mechanism arranged below said receptacle.

8. An apparatus for the purpose set forth comprising an open top receptacle, an open top foraminous basket mounted therein, a shaft for rotating said receptacle, a driven mechanism for operating the shaft and including simultaneously bodily shiftable shaft clutching and braking applying means a closure for the receptacle, means for supplying water at the bottom and for carrying it off at the top of the receptacle above said basket, and means for interengagement with said shaft clutching means for driving said mechanism to operate the shaft.

9. An apparatus for the purpose set forth comprising an open top receptacle, an open top foraminous basket mounted therein, a shaft for rotating said receptacle, a driven mechanism for operating the shaft and including simultaneously bodily shiftable shaft clutching and braking applying means, a closure for the receptacle, said shaft having its upper end fixed to the bottom of said receptacle and depending therefrom, means extending through said shaft for supplying water to the receptacle at the bottom thereof, means for carrying water off from the receptacle at the top thereof and above the basket, and means for interengagement with said shaft clutching means for driving said mechanism to operate said shaft.

10. In an apparatus for the purpose set forth a revoluble receptacle having an opening in its bottom, a perforated guard extending across said opening, a foraminous basket arranged within, carried by and spaced from said receptacle and further spaced from the guard, a driven shaft connected to the bottom of and operating said receptacle, means extending through the shaft for supplying water to the receptacle through said opening and guard, and a closure for the receptacle.

In testimony whereof, we affix our signatures hereto.

HAROLD F. VIEAU.
ROY C. HIGBY.
EDWARD J. O'NEILL.